(12) United States Patent
Dandaleix et al.

(10) Patent No.: US 12,091,161 B2
(45) Date of Patent: Sep. 17, 2024

(54) AIRCRAFT LANDING GEAR

(71) Applicant: SAFRAN LANDING SYSTEMS UK LTD, Gloucester (GB)

(72) Inventors: Pierre-Etienne Dandaleix, Gloucester (GB); Thibault Hernandez, Gloucester (GB); Andrew Mills, Gloucester (GB)

(73) Assignee: Safran Landing Systems UK Ltd (GB)

( * ) Notice: Subject to any disclaimer, the term of this patent is extended or adjusted under 35 U.S.C. 154(b) by 0 days.

(21) Appl. No.: 17/798,130

(22) PCT Filed: Feb. 4, 2021

(86) PCT No.: PCT/EP2021/052601
§ 371 (c)(1),
(2) Date: Aug. 8, 2022

(87) PCT Pub. No.: WO2021/156334
PCT Pub. Date: Aug. 12, 2021

(65) Prior Publication Data
US 2023/0076329 A1 Mar. 9, 2023

(30) Foreign Application Priority Data
Feb. 6, 2020 (EP) ..................................... 20155963

(51) Int. Cl.
*B64C 25/26* (2006.01)
*B64C 25/12* (2006.01)
(Continued)

(52) U.S. Cl.
CPC .............. *B64C 25/26* (2013.01); *B64C 25/20* (2013.01); *F16F 1/32* (2013.01); *B64C 2025/125* (2013.01)

(58) Field of Classification Search
CPC .. B64C 25/18; B64C 25/20; F16F 1/32; F16F 1/182; F16F 1/324; F16F 1/128
See application file for complete search history.

(56) References Cited

U.S. PATENT DOCUMENTS

| | | | | |
|---|---|---|---|---|
| 1,544,032 A | * | 6/1925 | Potez | ...................... B64C 25/64 |
| | | | | 139/345 |
| 2,482,449 A | * | 9/1949 | Wells | ......................... F16F 1/32 |
| | | | | 267/162 |

(Continued)

FOREIGN PATENT DOCUMENTS

| EP | 2925605 A1 | 10/2015 |
|---|---|---|
| EP | 3069993 A1 | 9/2016 |

OTHER PUBLICATIONS

Dharan et al., "Composite disc springs", Composites: Part A 38 (2007), pp. 2511-2516.

(Continued)

*Primary Examiner* — Michael H Wang
*Assistant Examiner* — Colin Zohoori
(74) *Attorney, Agent, or Firm* — Buchanan Ingersoll & Rooney PC

(57) ABSTRACT

An aircraft landing gear comprising: a first member, a second member pivotally coupled to the first member, and a spring coupled to the first and second members, the spring comprising a plurality of elastically deformable washers, the spring being arranged to generate a biasing force between the first and second members to bias the first member toward a predetermined orientation relative to the second member.

16 Claims, 14 Drawing Sheets

(51) Int. Cl.
  *B64C 25/20* (2006.01)
  *F16F 1/32* (2006.01)

(56) References Cited

U.S. PATENT DOCUMENTS

| | | | |
|---|---|---|---|
| 2,708,110 A * | 5/1955 | Clay | F16F 1/32 |
| | | | 267/162 |
| 3,345,019 A | 10/1967 | Black et al. | |
| 9,862,483 B2 * | 1/2018 | Schmidt | B64C 25/10 |
| 2011/0148015 A1 | 6/2011 | Hodgson | |
| 2012/0211600 A1 * | 8/2012 | Mellor | B64C 25/62 |
| | | | 244/100 R |
| 2014/0252705 A1 * | 9/2014 | Campbell | F16F 1/44 |
| | | | 29/896.9 |
| 2019/0202550 A1 | 7/2019 | Evans et al. | |

OTHER PUBLICATIONS

Extended European Search Report for European Application No. 201 559 63.0, dated Aug. 24, 2020, 10 pages.

International Search Report and Written Opinion for International Application No. PCT/EP2021/052601, dated May 3, 2021, 15 pages.

* cited by examiner

AIRCRAFT LANDING GEAR

This application is a U.S. National Phase application of PCT International Application No. PCT/EP2021/052601, filed Feb. 4, 2021, which claims the benefit of EP 20155963.0, filed Feb. 6, 2020, both of which are incorporated by reference herein.

FIELD OF THE INVENTION

This invention relates to an aircraft landing gear and an aircraft incorporating such a landing gear.

BACKGROUND

Aircraft landing gear are arranged to support aircraft when they are on the ground and so typically comprise a wheel or other ground contacting mechanism. The aircraft landing gear are typically movable between an extended position, where the landing gear is arranged to support the aircraft on the ground and a retracted position in which the landing gear is folded so as to be housed within a fuselage or other aircraft location, which may avoid an increase in drag.

When a landing gear is deployed, it is important that it is maintained in the deployed position and cannot be retracted unintentionally. Therefore landing gear are provided with stay assemblies which may support a main strut of the landing gear and the stay assemblies may be locked in place via lock assemblies.

Lock assemblies are formed of lock links which may be placed in an 'over centre' position when the landing gear is deployed such that they cannot be folded without direct actuation and thereby the landing gear may be locked in a deployed position.

The lock links cannot be moved into their locked, 'over centre' position via the simple kinematics of the landing gear assembly and the weight of the lock links alone. There is therefore a need for some other force to fully deploy the landing gear.

The force is commonly provided by a helical spring. However, helical springs may be susceptible to vibration due to their shape, may have a high degree of weight, and may also suffer from creep if they are permanently stressed.

SUMMARY OF THE INVENTION

According to a first aspect of the present invention, there is provided an aircraft landing gear comprising: a first member, a second member pivotally coupled to the first member, and a spring coupled to the first and second members, the spring comprising a plurality of elastically deformable washers, the spring being arranged to generate a biasing force between the first and second members to bias the first member toward a predetermined orientation relative to the second member.

The use of elastically deformable washers, as opposed to helical springs, may provide an improved landing gear for at least the reason that the range of materials out of which elastically deformable washers may be formed is greater than the range of materials that out of which helical springs may be formed. Further, by varying the number of washers, the length of the present springs may be more easily customised than those of the prior art. Further still, helical springs travelling in a direction perpendicular to their longitudinal axis may be aerodynamically considered as a bluff body and may therefore suffer from aeroelastically induced vibrations. By comparison, substantially disk shaped washers may have improved aerodynamics and may therefore not suffer from such severe aeroelastic vibrations.

The elastically deformable washers may also have improved robustness in comparison to helical springs and may have improved impact resistance.

When helical springs are used, they will often be fixed such that they are constantly in tension regardless of the condition of the landing gear. However, a constant tensile stress applied for a long time can lead to creep, which lengthens the material in the unstressed state and reduces the elastic tensile force generated at a given length of the material. Springs formed from separable washers may also not suffer from tensile stresses and so creep of the material in the spring may be reduced.

The spring may further comprise a sliding rod coupled to the first and second members, and arranged to slide relative to the first and/or second member, the sliding rod extending through the elastically deformable washers. The sliding rod may provide a structural support to the washers and may thereby prevent the spring from buckling in compression.

The aircraft landing gear may further comprise a disk arranged to slide along the sliding rod and arranged to engage the sliding rod so as to prevent relative rotation between the disk and the sliding rod, the disk being arranged to abut the elastically deformable washers. The disk may prevent any rotational movement from being transferred to the washers and may thereby prevent any torsional stress from being transferred to the washers. The disk may also provide a planar surface for an end-most elastically deformable washer of the spring to abut and may thereby prevent stress concentrations and damage which would occur if the elastically deformable washer were to abut an uneven surface.

The aircraft landing gear may further comprise a guiding shaft disposed parallel to the sliding rod and/or to the spring and a further washer arranged to slide along the guiding shaft and the sliding rod, the further washer being rotationally fixed relative to the sliding rod and arranged to abut at least one of the elastically deformable washers. The further washer may provide a smooth end surface for the spring to abut and may thereby prevent damage to the washers. The further washer may also prevent any torsional forces from being transmitted to the washers. The further washer may also be substantially rigid and not deformable.

The elastically deformable washers may be separable and arranged to abut each other, and the spring may be arranged to generate a compressive biasing force. Since materials suffering tensile forces often suffer from creep, this may reduce the likelihood of the spring suffering from creep.

The elastically deformable washers may be conical washers. Alternatively, hemispherical washers or other shaped washers may be used. The conical washers may also be referred to as coned-disk washers or Belleville washers.

The elastically deformable washers may be formed from an anisotropic material, which may be a composite material, optionally a reinforced fibre thermoplastic composite material. The material used may be carbon fibre in combination with an epoxy or thermoplastic resin such as PEEK, LM-PAEK and PEKK. The use of a thermoplastic may improve the resilience of the elastically deformable washer as well as allowing an improved speed of manufacture.

The aircraft landing gear may comprise: a main strut arranged to be coupled to an aircraft and movable between a deployed condition and a retracted condition, a stay arranged to support the main strut, the stay comprising a first stay arm coupled to the main strut and a second stay arm pivotally coupled to the first stay arm and arranged to be coupled to the aircraft, and a lock stay arranged to prevent movement of the stay when the lock assembly is in a locked position, the lock assembly comprising a first lock link pivotally coupled to the stay and the second lock link pivotally coupled to the first lock link and arranged to be coupled to the aircraft or another component of the landing gear assembly, wherein the first member is the first lock link or the second lock link.

This may allow the spring to bias the lock link directly such that the lock assembly attains an 'over centre', generally aligned position.

The first member may be the first lock link and the second member may be the first or second stay arm or the second lock link. Alternatively, the first member may be the second lock link and the second member may be the main strut or the aircraft.

The biasing force may be arranged to bias the first and second members such that the lock assembly is biased into a locked arrangement. The locked arrangement may be an over centred position, in which an angle between the first and second lock links, on the side of the joint between the first and second lock link, adjacent the aircraft, is greater than 180 degrees. Put another way, for a lock link to move from an orientation where the landing gear is retracted to a locked position, the lock link must rotate to a straight position and continue rotating past the straight position to a position described as an 'over centre' position. An angle between the first and second lock links which is acute when the landing gear is retracted will be a reflex angle in the locked position.

The landing gear may comprise a main strut arranged to be coupled to an aircraft and movable between a deployed condition and a retracted condition, a stay arranged to support the main strut, the stay comprising a first stay arm coupled to the main strut and a stay arm pivotally coupled to the first stay arm and arranged to be coupled to the aircraft, wherein the first member is the second stay arm and the second member is the aircraft or the first stay arm. By biasing the stay arm directly with the spring, the requirement for a lock link may be removed and thus, there may be provided a lighter landing gear.

When the main strut is in the retracted condition, the elastically deformable washers may be substantially unstressed. This may involve the elastically deformable washers having a minimal compressive stress preventing free movement and vibration of the washers, but no substantial compressive force may be generated to bias a component outside the spring assembly.

Where there is provided a disc arranged to engage a sliding rod, the disc may engage a groove of the sliding rod and a minimum compressive load on the spring may the applied in the substantially unstressed state, due to engagement between the disc and an end point of the groove. The disc and an end stop, the end stop being at an opposite end of the spring from the disc, may determine a maximum length of the spring and thereby a minimum compressive stress.

Where there is a further washer, the further washer may slide along a guiding shaft and may engage an end of the guiding shaft in order to limit movement of the further washer. In conjunction with an end stop, the end stop being at an opposite end of the spring from the further washer, the further washer may limit the maximum length of the spring and may thereby provide a minimum compressive force to the spring.

According to a second aspect of the invention, there is provided an aircraft including an aircraft landing gear according to the first aspect of the invention.

DETAILED DESCRIPTION

Figure 1:
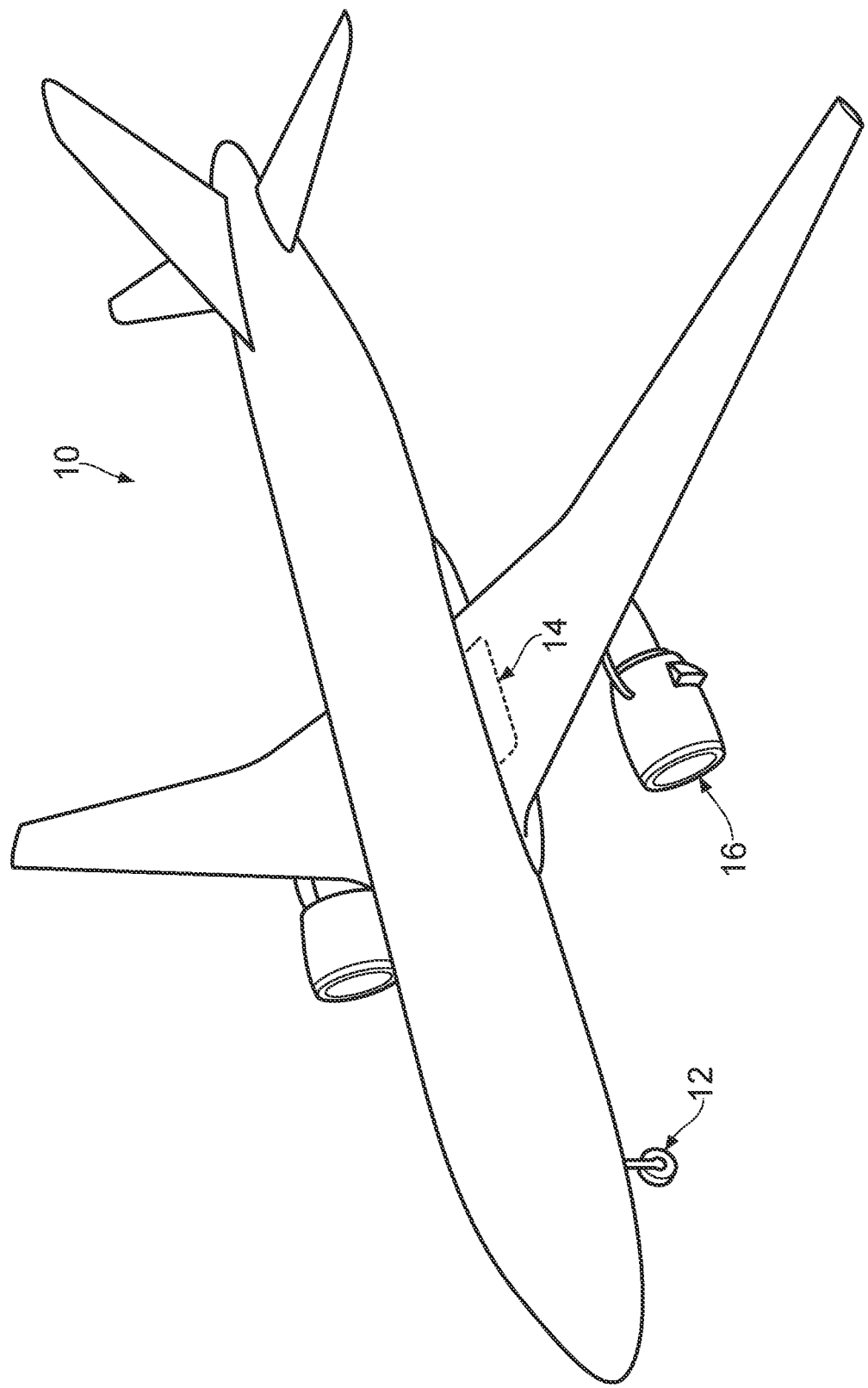
FIG. 1 shows a general view of an aircraft according to the invention.

FIG. 1 is a diagram of an aircraft 10. The aircraft 10 includes assemblies such as a nose landing gear 12, one or more main landing gear 14 and engines 16. Other aircraft assemblies will be apparent to the skilled person. The term aircraft as used herein includes aeroplanes, helicopters, UAVs and the like.

Referring now to FIGS. 2a to 2d, an aircraft landing gear 100 is shown. The landing gear assembly 100 includes a main strut 102, which may have a shock absorbing function and may comprise a piston slidably coupled within a housing. The main strut 102 may also be referred to as a main fitting. The main strut is pivotably coupled to the underside 10a of the aircraft 10 at a pivot location 106. At a bottom end of the main strut 102, there is a wheel and brake assembly 104, which may be more generally considered to be a ground-contacting assembly and may be replaced with a skid assembly or the like.

Figure 2A:
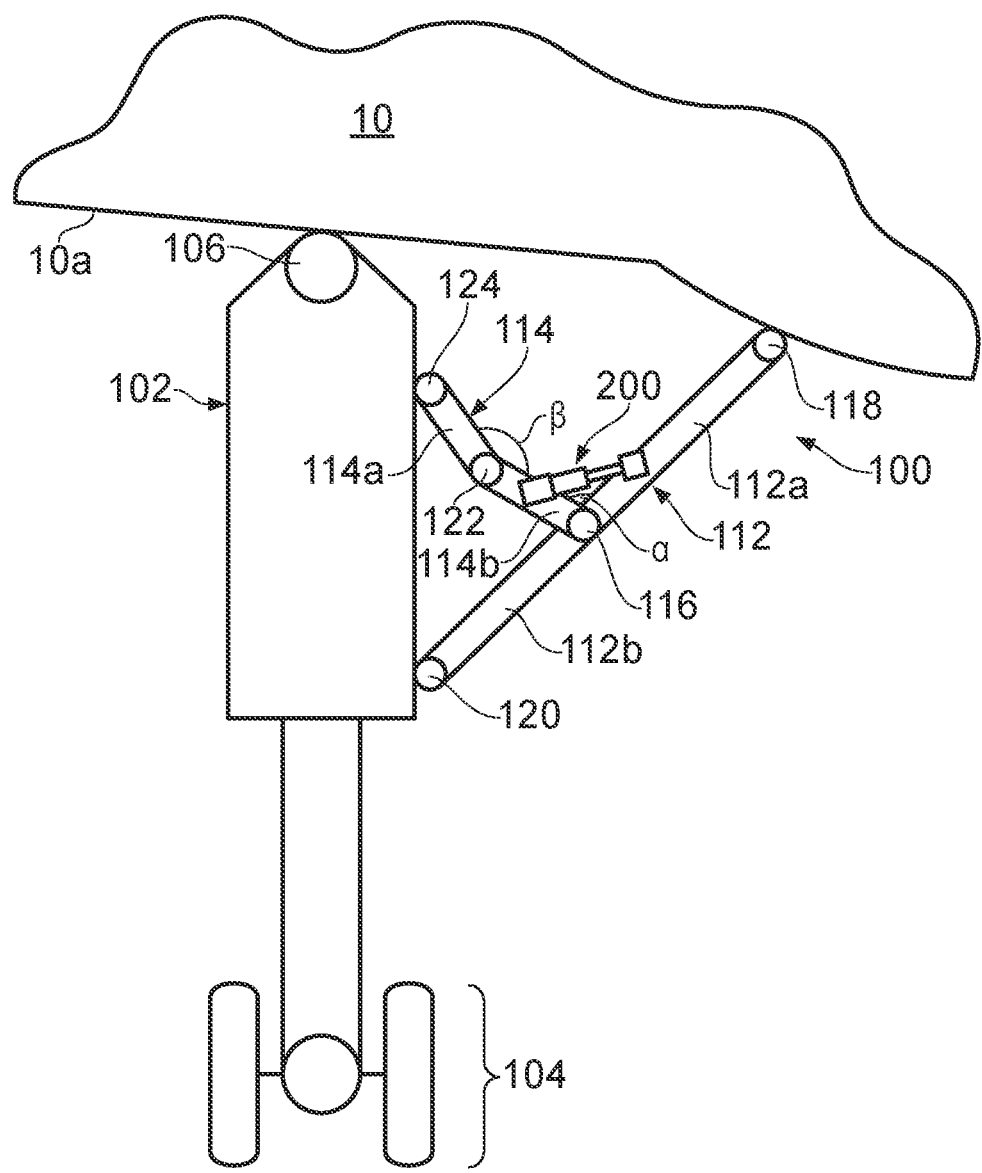
FIGS. 2a to 2d show a landing gear in accordance with the invention in a range of positions between fully extended and retracted.

When in a deployed position, as shown in FIG. 2a, the main strut 102 is supported by a foldable stay 112, and the stay 112 may be locked in place by a lock assembly 114, which may also be referred to as a lock link assembly. A spring assembly 200 is mounted to the stay 112 and arranged to urge the lock assembly 114 to assume a locked state.

The stay 112 has an elongate upper stay arm 112a having a lower end defining a pair of lugs pivotally coupled via a pivot pin 116 to a pair of lugs defined at an upper end of an elongate lower stay arm 112b. The stay arms 112a and 112b may therefore be pivotally moveable relative to one another about the pivot pin 116. The upper end of the upper stay arm 112a defines a pair of lugs that are pivotally coupled to a lug of a connector 118, which in turn is pivotally coupled to the underside 10a of the aircraft 10. The lower end of the lower stay arm 112b defines a pair of lugs pivotally coupled to a lug of a connector 120 which in turn is pivotally coupled to the main strut 102.

The lock assembly 114 is formed of two lock links, also known as link arms: an elongate upper lock link 114a having a lower end pivotally coupled to an upper end of an elongate lower lock link 114b via a pivot pin 122, and the lower lock link 114b. The lock links 114a, 114b may therefore move pivotally relative to one another about the pivot pin 122. An upper end of the upper link arm 114a defines a pair of lugs that are pivotally coupled to a lug of a connector 124, which in turn is pivotally coupled to the main strut 102. A lower end of the lower link arm 114b defines a lug that is pivotally coupled to lugs of the stay arms 112a, 112b via the pivot pin 116. Lugs of the upper stay arm 112a are disposed between the lugs of the lower stay arm 112b and the lugs of the lower link arm 14b.

When the lock assembly 114 is in the locked condition, as illustrated in FIG. 2a, the upper and lower lock links 114a, 114b are generally longitudinally aligned or coaxial, and can be 'over-centre', such that the lock assembly 114 is arranged to oppose a force attempting to fold the stay 112, so as to move the landing gear assembly from the deployed condition towards the stowed condition. Generally, when in the locked condition, the lock assembly 114 will resist compressive forces applied to it along the length of the lock assembly 114 and the central hinge, at the pivot pin 122, of the lock assembly 114 is at a limit of its range of movement. In this arrangement, the over-centre condition is where the angle β, measured between the two lock links 114a, 114b on an aircraft side of the joint between the lock links 114a, 114b, is less than 180°.

The aircraft landing gear assembly is movable between a deployed, locked condition shown in FIG. 2a, for take-off and landing, and a stowed condition for flight. An actuator (not shown) is provided for moving the landing gear between the deployed condition and the stowed condition. This actuator is known in the art as a retraction actuator, and more than one may be provided. A retraction actuator may have one end coupled to the airframe and another end coupled to the main strut such that extension and retraction of the actuator results in movement of the main strut between deployed and stowed conditions.

Figure 2B:
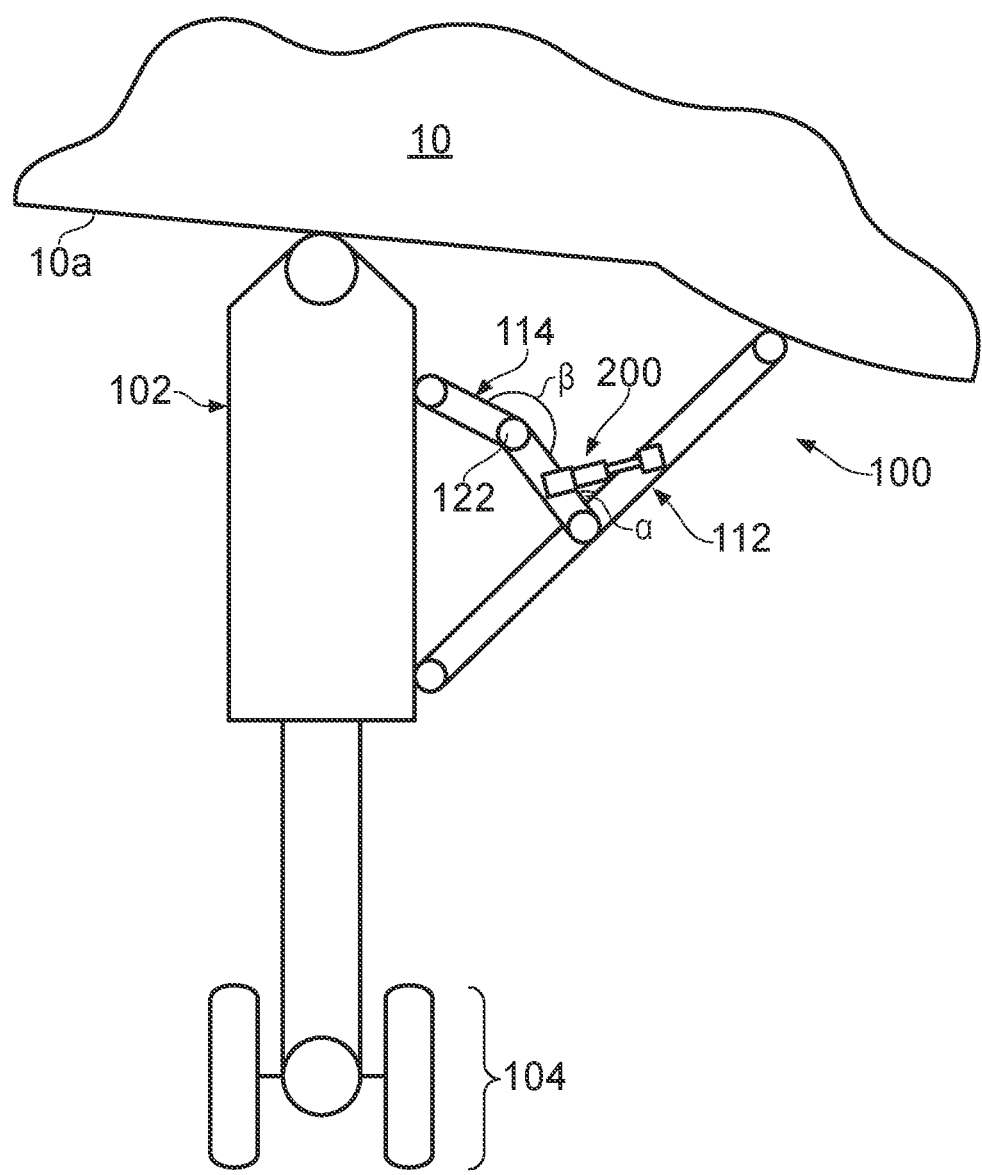

For the landing gear 100 to be retracted, the lock assembly 114 must be broken, as shown in FIG. 2b, to enable the stay 112 to be folded, thereby permitting the main strut 102 to be moved by the retraction actuator towards the stowed condition. When the lock assembly 114 is broken, the angle β is greater than 180°. An unlock actuator, not shown, may also be provided for moving the lock assembly from the locked position shown in FIG. 2a to the unlocked position shown in FIG. 2b; changing the angle 3 from less than 180° to greater than 180°.

Figure 2C:
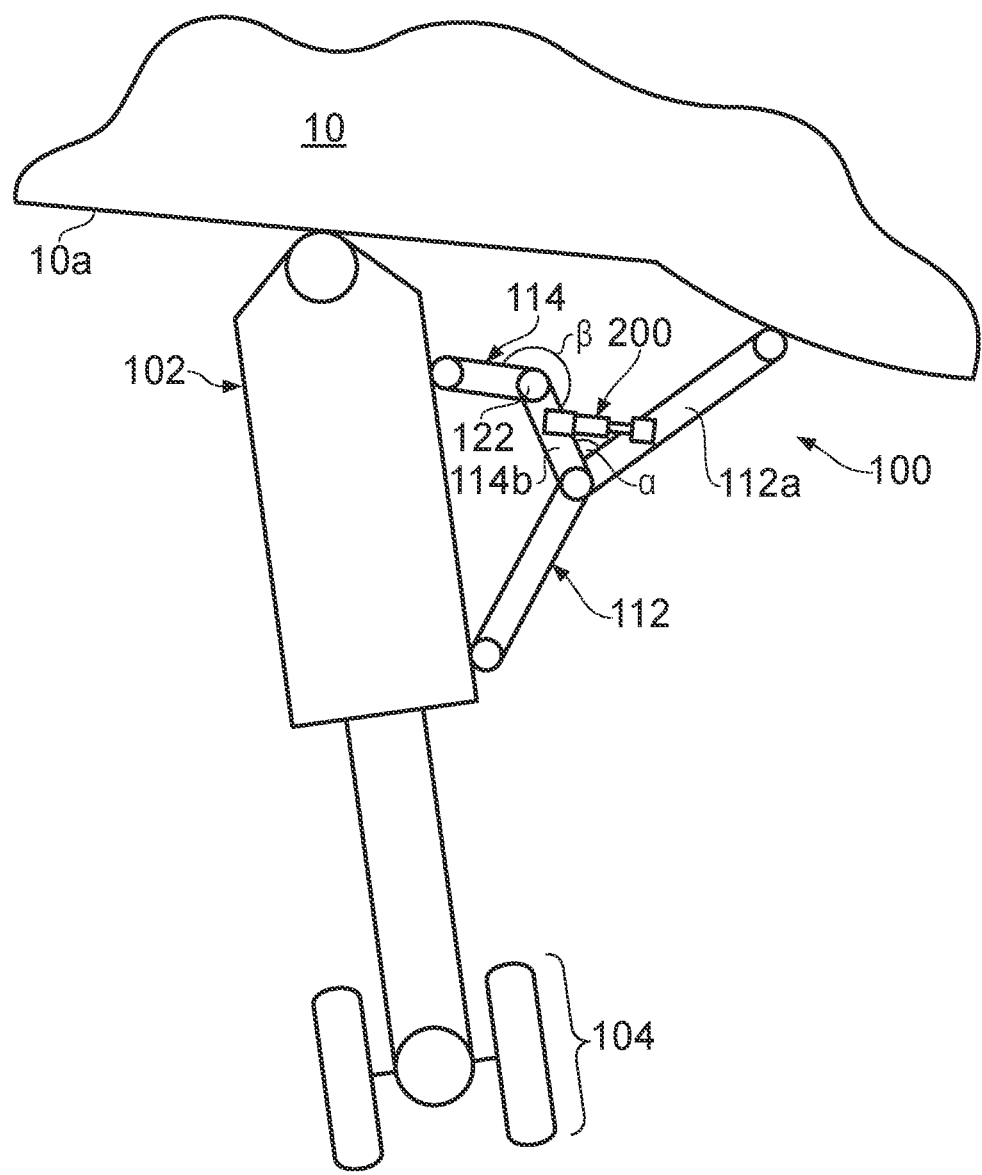
Figure 2D:
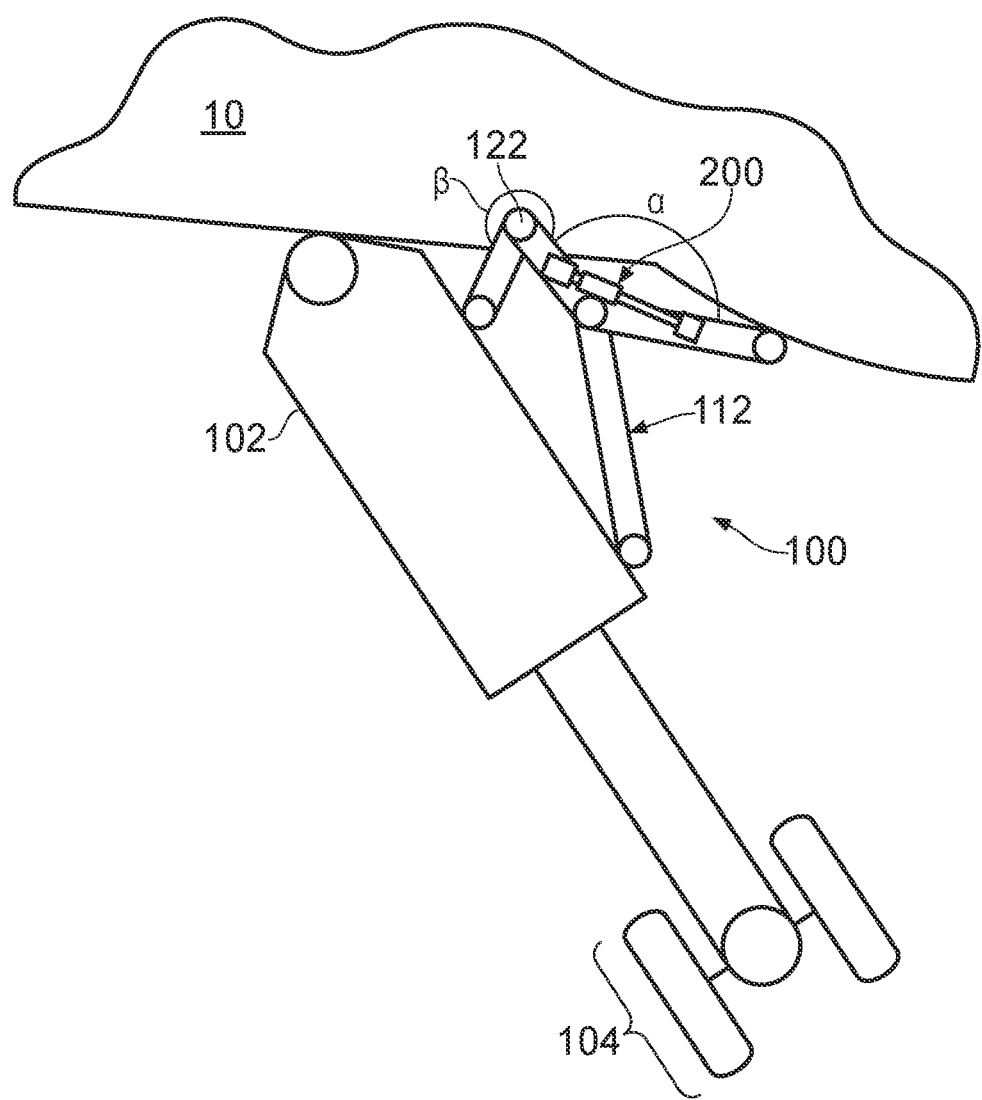

The stay 112 serves to support the orientation of the main strut 102 when the landing gear 100 is in the deployed condition. The stay 112 generally includes a two bar linkage that can be unfolded to assume a generally straight or aligned condition in which the stay 112 inhibits movement of the main fitting, as shown in FIG. 2a. When the stay is broken, it no longer reacts pivotal movement of the main strut 102 and the main strut 102 can be moved by the retraction actuator towards the stowed condition, as shown in FIGS. 2c and 2d. During flight the stay 112 is arranged in the folded condition, while during take-off and landing the stay 112 is arranged in the generally straight or aligned condition. Some main landing gear assemblies include a pair of stays coupled to a common shock absorbing strut.

One or more down lock spring assemblies 200 are generally provided to assist in moving the landing gear assembly to the deployed condition and locking it in that state by moving the lock assembly 114 to the locked condition. Down lock spring assemblies 200 also inhibit the lock link accidentally being unlocked. The spring assembly 200 is arranged to bias the lock link 114 towards the locked condition by way of an elastic restoring force.

The spring assemblies act to increase the angle α between the upper stay arm 112a and the lower lock link 114b. As the angle α increases, the angle β decreases (assuming the geometry of the rest of the landing gear assembly 100 remains constant). However, as the landing gear 100 retracts and the main strut 102 pivots to a retracted position, the angle α increases. As the landing gear 100 retracts to the position shown in FIG. 2d, and further, the angle α becomes sufficiently large that the spring assembly 200 may exert no compressive force between the upper stay arm 112a and the lower lock link 114b.

Figure 3:
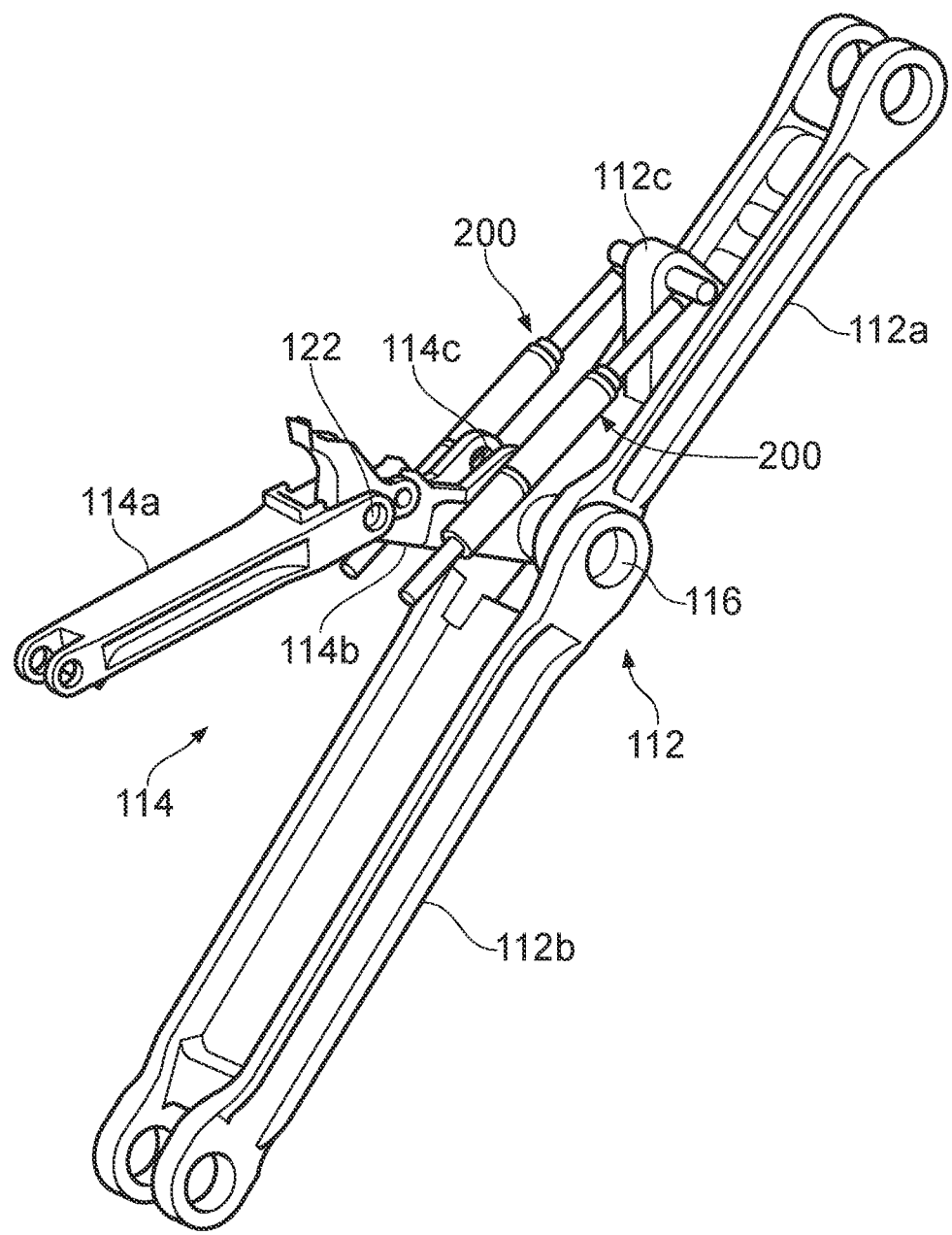
FIG. 3 shows a general view of stay and lock assembly of a landing gear according to the invention.

FIG. 3 shows two spring assemblies 200 arranged between the stay assembly 112 and the lock assembly 114. The spring assemblies 200 may exert an elastic restoring force between an upper stay arm 112a and the lower lock link 114b. As the springs of the spring assemblies 200 may be in compression, they will urge the lock assembly 114 into a locked condition.

The spring assemblies 200 may be coupled to the stay assembly 112 and the lock assembly 114 at respective connecting lugs 112c, 114c. It can also be seen that two spring assemblies 200 may be provided, and that the connecting lugs 112c, 114c may be arranged between the spring assemblies, such that the arrangement is substantially symmetrical and that torsional stresses about respective elongate axes of the stay arm 112a and the lower link arm 114a may be reduced.

Figure 4A:
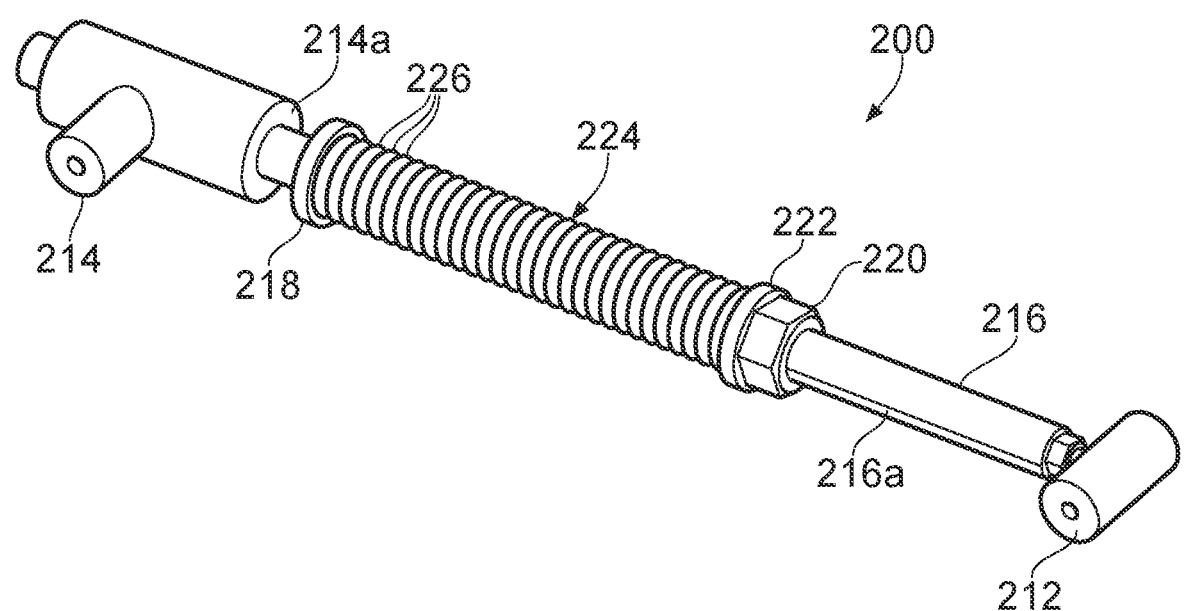
FIG. 4a shows a general view of a spring assembly according to the invention.

FIG. 4a shows a general view of a spring assembly 200. The spring assembly 200 is formed from a sliding rod, shaft or tube 216, which extends along the length of the spring assembly 200 between first and second connecting lugs 212, 214, and a spring 224 formed of a plurality of elastically deformable washers 226.

The spring 224 abuts an end stop 222, which is fixed in place by an end nut 220, which may be screwed onto a thread 216b on the outer surface of the sliding rod 216. The end nut 220 and end stop 222 may be separate parts arranged in abutment or may be glued together or integrally formed. By rotating the nut 220, the position of the end stop 222 may be altered and thereby the minimum compressive stress in the spring 224 and the maximum length of the spring 224 may be altered. The end stop 222 may alternatively be integrally formed with the sliding rod 216 or may be glued to the sliding rod 216. However, it is preferable that the end stop 222 and nut 220 are moveable relative to the sliding rod 216 so that a minimum compressive stress preload in the spring 224 can be applied and/or adjusted. The end stop 222 and nut 220 may be fixed to the sliding rod 216 after a preload is applied, such as by gluing.

At the opposite end of the spring 224, there is a disc 218, which may provide a substantially flat, planar surface for the spring 224 to abut and the disc 218 may engage a longitudinal groove 216a of the sliding rod 216 such that it remains irrotational relative to the sliding rod 216 and is arranged to slide along the shaft 216 to translate but not to rotate relative to the shaft 216. Thereby, torsional forces about the shaft 216 exerted on the spring 224 may be reduced. The groove 216a may extend only part of the way along the rod 216 and the disc 218 may engage an end of the groove, thereby limiting the range of movement of the disc 218 and the maximum length of the spring 226. In contrast to the elastically deformable washers 226, the disc may be substantially planar and may be substantially rigid.

At a first end of the spring assembly 200, there is a first connecting lug 212 arranged to be coupled to the stay assembly 112, and in particular to the connecting lug 112c of the stay assembly 112. The first connecting lug 212 of the spring assembly 200 may be formed separately from the sliding rod 216, as shown in FIG. 4b, and may be screwed into it or otherwise fixed to it.

At an opposite end of the spring assembly 200, there is a second connecting lug 214 arranged to be fixed to the lock assembly 114, and in particular to the connecting lug 114c of the lock assembly 114. The second connecting lug 214 comprises a passage for receiving the sliding rod 216, so that the second connecting lug 214 may slide relative to the sliding rod 216. Thereby, an end surface of the second connecting lug 214a may abut the disc 218 when the spring assembly 200 is compressed by relative movement of the lock assembly 114 and the stay assembly 112 so as to compress the spring 224, which will provide an elastic restoring force in order to bias the lock assembly 114 into a locked condition.

Figure 4C:
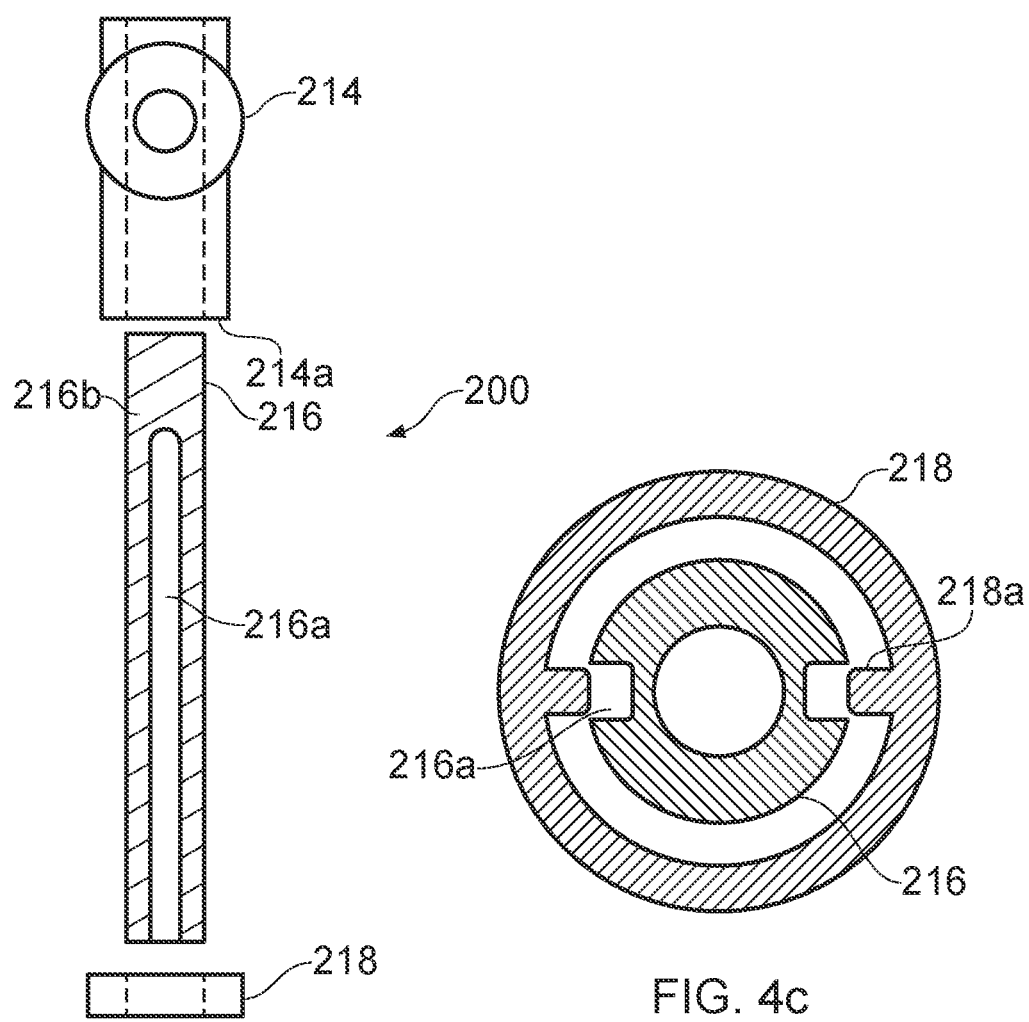
FIG. 4c shows a cross section of a portion of the spring assembly.
Figure 4B:
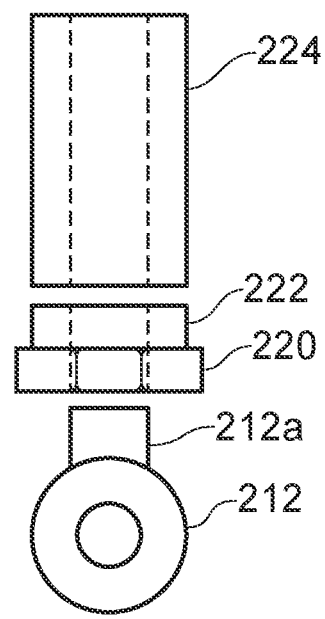
FIG. 4b shows an exploded side view of the spring assembly.

As shown in FIG. 4b, the separate elements of the spring assembly 200 may be formed separately and may be threaded onto the shaft 216. The schematic cross section in FIG. 4c shows how the disc 218 may have radially inward protrusions 218a arranged to engage the longitudinal grooves 216a of the shaft 216 so as to prevent relative rotation between the disc 218 and the central shaft 216. The central shaft 216 may be coated with hard anodised aluminium or PTFE in order to reduce friction between the washers 226 and the shaft 216. Alternatively, bushings may be inserted between the washers 226 and the shaft 216.

Figure 5A:
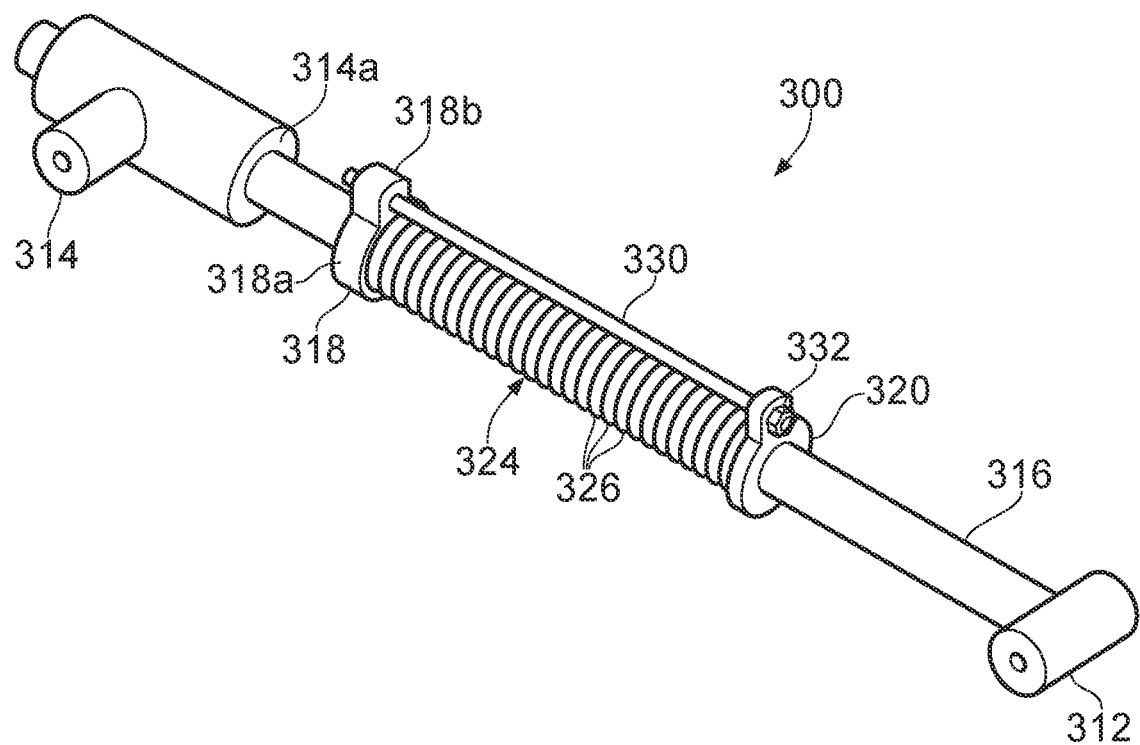
FIG. 5a shows a general view of an alternative spring assembly according to the invention.

FIG. 5a shows a perspective view of an alternative spring assembly 300. In the alternative spring assembly 300, there is a sliding rod 316 integrally formed with an end stop 320 and a first connecting lug 312, the first connecting lug 312 being arranged to couple to the stay assembly 112 in substantially the same manner as the first connecting lug 212 of the first-mentioned spring assembly 200. At an opposite end of the sliding rod 316, there is a second connecting lug 314, having a passage through which the sliding rod 316 may pass and the second connecting lug 314 may be substantially similar to the second connecting lug 214 of the first mentioned spring assembly 200, having an end face 314a arranged to abut a further washer 318.

The further washer 318 may slide relative to the sliding rod 316 and may have a first annular portion 318a surrounding the sliding rod 316 and a second annular portion 318b surrounding a guiding shaft 330 adjacent to and parallel to the sliding rod 316. In contrast to the elastically deformable washers 326, the further washer 318 may be substantially planar and substantially rigid. The further washer 318 may also have a figure-of-8 shape.

The sliding rod 316 may, in this example, not have a groove. The further washer 318, arranged to slide relative to the central shaft 316 and arranged to abut the spring 324, may be rotationally fixed via the guiding shaft 330, which may extend through a second annular portion 318b of the further washer 318. The guiding shaft 330 may be fixed via a nut 332 and may therefore comprise a thread 330a. The nut 332 may limit the range of movement of the further washer 318 and may thereby prevent the elastically deformable washers 326 of the spring 324 from moving freely or vibrating when the spring 324 is substantially uncompressed. By rotating the nut 332 relative to the guiding shaft 330, the nut 332 may move along the guiding shaft and the maximum length of the spring 324 may thereby be adjusted. The nut may abut the end stop 320, through which the guiding shaft 330 may pass.

The further washer 318 may be limited in its range of movement by an enlarged portion 330b of the guiding shaft 330, which may have an outer diameter larger than the inner diameter of the second annular portion 318b.

The spring 324 of the alternative spring assembly 300 may be substantially similar to the spring 224 of the first-mentioned spring assembly 200.

Figures 5B, 5C:
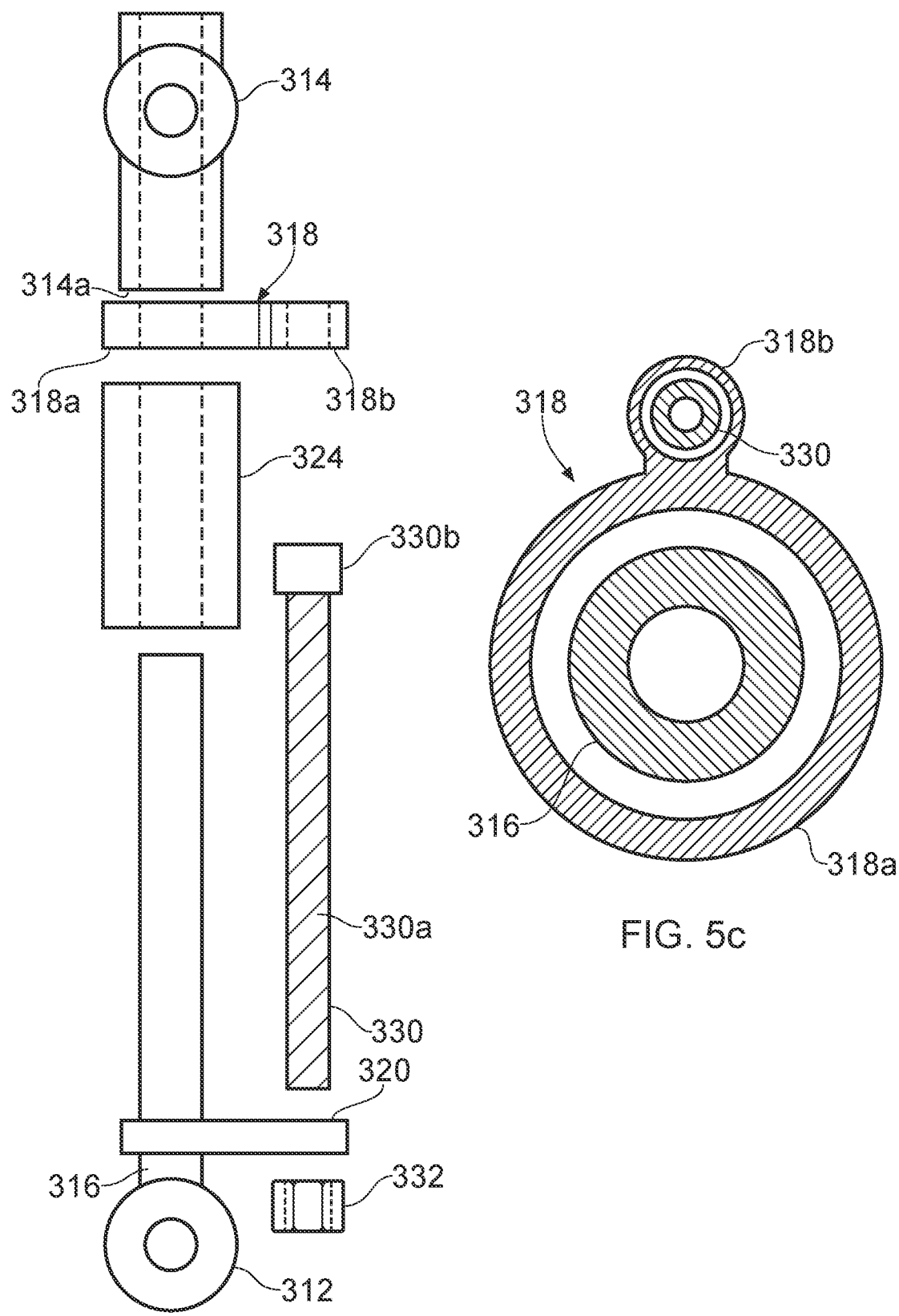
FIG. 5b shows an exploded side view of the alternative spring assembly.
FIG. 5c shows a cross section of a portion of the alternative spring assembly.

The parts of the spring assembly 300 are shown in an exploded plan view in FIG. 5b. From this view, it can be seen that the guiding shaft 330, when the spring 324 is compressed, may extend over the second connecting lug 314. This may allow a more compact arrangement. This function may be allowed by the sizing of the further washer 318, which is shown in cross-section in FIG. 5c.

In further varied embodiments, spring assemblies may have no sliding rod, and the elastically deformable washers may be joined as a single unit, such as by welding. In particular, resistance welding, induction welding and ultrasonic welding may be suitable for use with thermoplastic materials. Alternatively, resistance to buckling of the spring may be provided by an external tube in which the washers may be placed.

Figure 6:
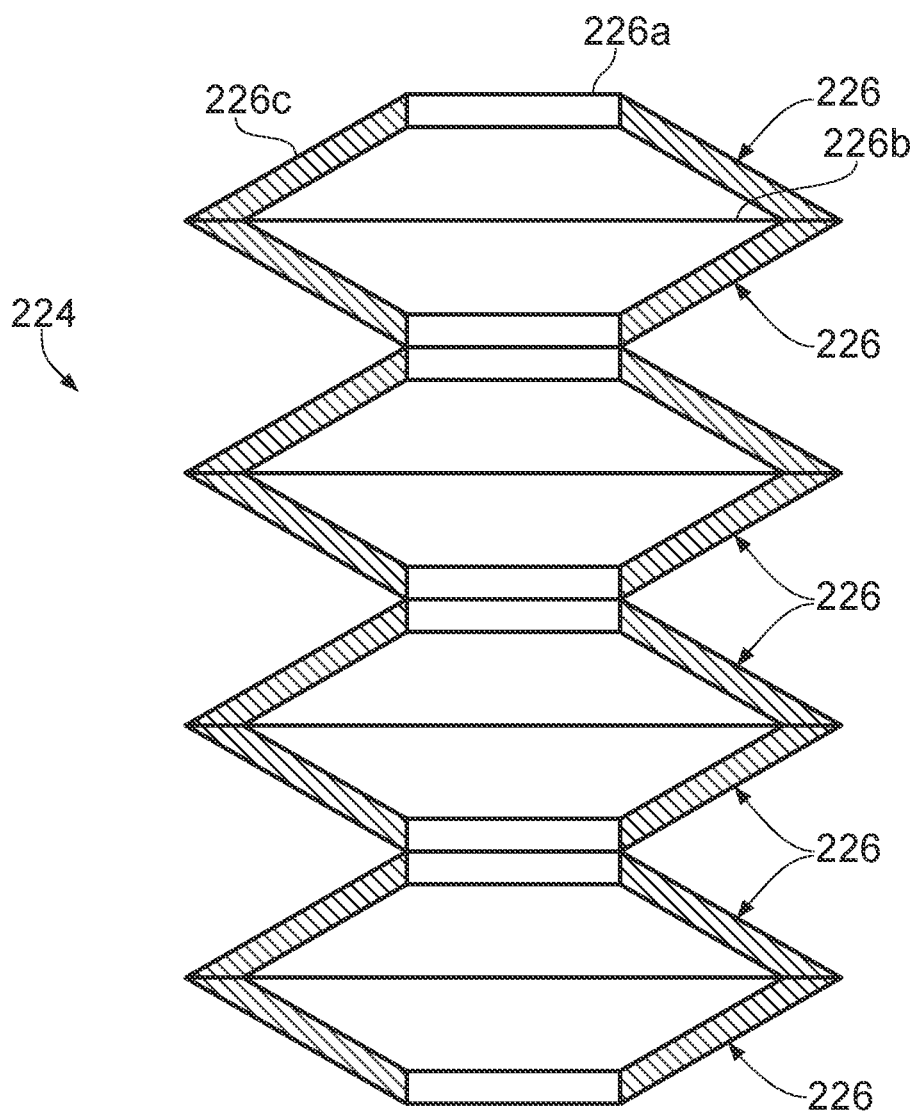
FIG. 6 shows a schematic cross-sectional view of a spring for use in a spring assembly according to the invention.

FIG. 6 shows a schematic cross section of a spring 224, incorporating eight elastically deformable washers 226 arranged back to back or alternately facing in opposite directions. However, the washers may alternatively be arranged in nested arrangements, where a convex portion of one washer is received in a concave portion of another. As a further alternative, the elastically deformable washers 226 may be arranged where a portion of the washers are nested and a portion are in back to back abutment. Different numbers of washers from eight may also be used.

Figure 7A:
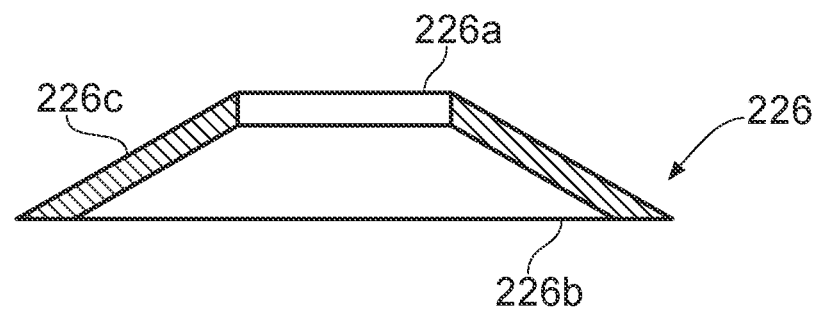
FIGS. 7a and 7b show a side view and a plan view of an elastically deformable washer for use in a spring assembly according to the invention.
Figure 7B:
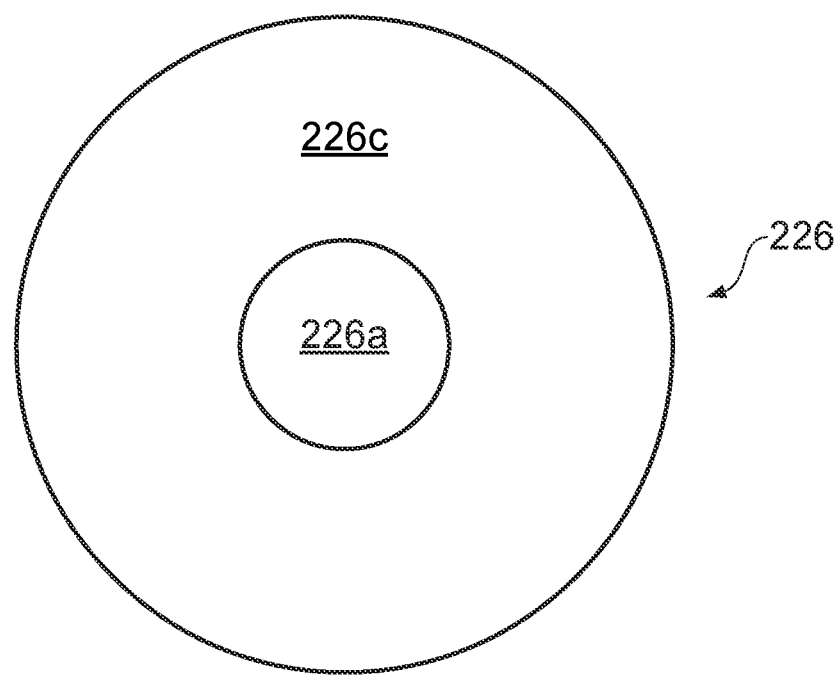

FIG. 7a shows a cross section of a single washer 226, the washer being generally conical and annular, having a frusto conical shape with a wide circular base 226b and a smaller central hole 226a, and a sloping side 226c. Such a washer may be referred to as a Belleville washer.

Alternative shapes of washer may be used, such as substantially hemispherical washers or washers with curved sides 226c. The washers may also have non-axisymmetric geometries such as being square or rectangular in plan view. Such washers may have a frusto-pyramidal shape. The washers may and may have portions extending in alternating axial directions, such as biconvex washers formed from flat sheets.

The elastically deformable washers 226 may also be formed from composite materials such as carbon fibre, which may be lighter than steel washers or other metallic washers. Such materials may be anisotropic.

Figure 8A:
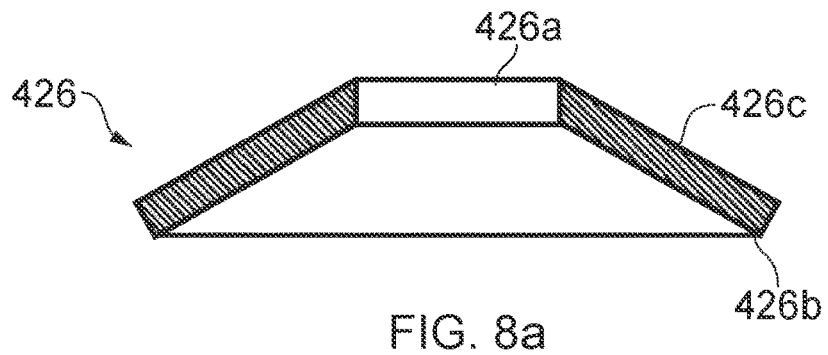
FIGS. 8a and 8b show an alternative washer and an alternative spring formed of the alternative washers.

FIG. 8a shows an alternative washer 426 which may be used in place of the washers 226 described above. The alternative washer 426 has a different profile from the earlier-described washers, as shown in FIG. 8a. The central hole 426a and sloping side 426c is substantially similar to those of the earlier-described washers. However, the base 426b is formed as an edge of the washer 426, with the washer 426 not having a flat surface acting as the base 426b.

Figure 8B:
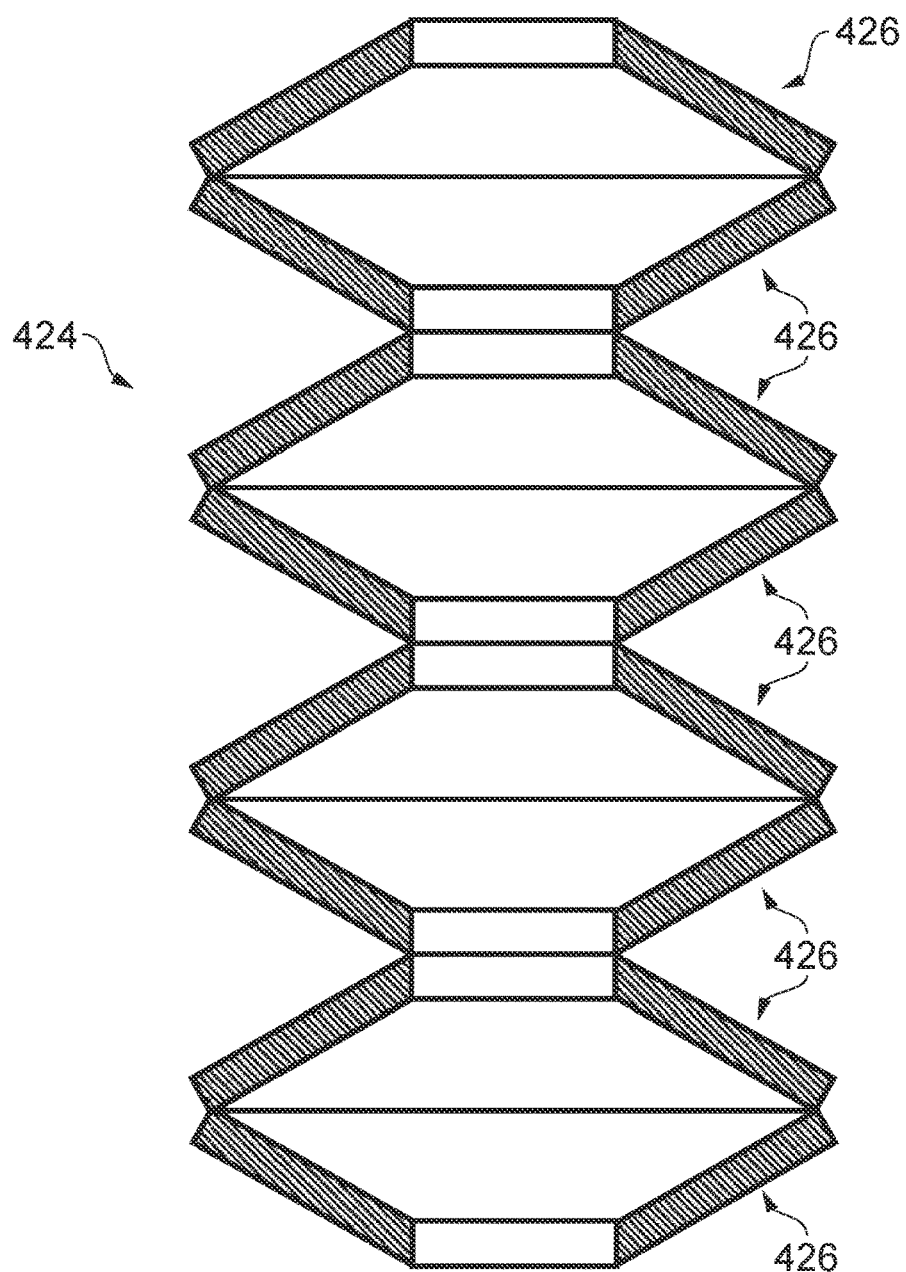

FIG. 8b shows how the alternative washers 426 may abut to form a spring 424. It can be seen that the contact between washers at their respective bases 426b is a thin, linear contact ring, as opposed to a thicker contact ring where different washers with flat bases are used.

Figure 9A:
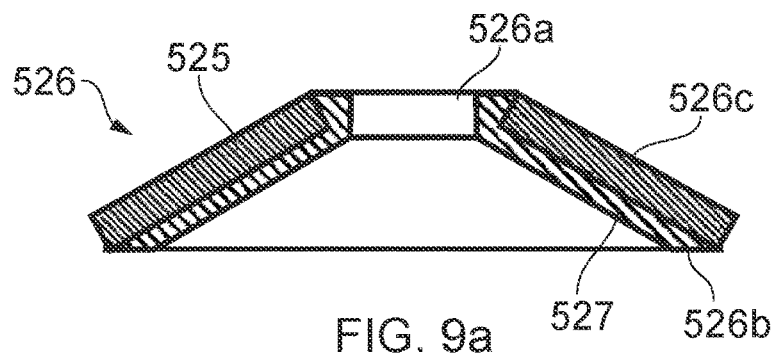
FIGS. 9a and 9b show a further alternative washer and a further alternative spring formed of the further alternative washers.

A further alternative washer 526 is shown in FIG. 9a. The further alternative washer 526 has two portions: a composite, fibre reinforced portion 525 and a resin portion 527. The resin portion 527 may be formed of a thermoplastic resin and may be more accurately machined to manage wear and tolerances.

Figure 9B:
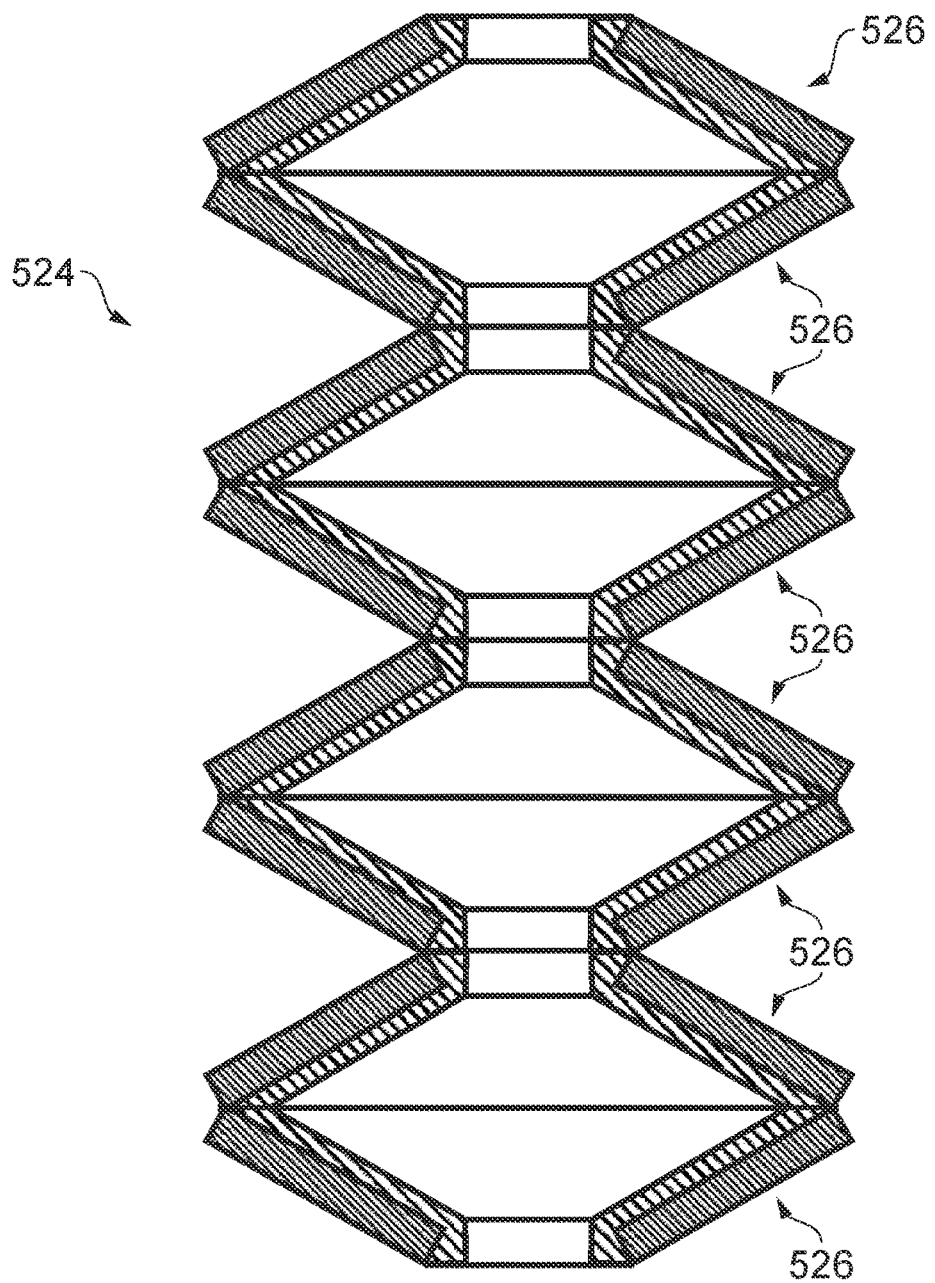

The portions of the washers 526 arranged to contact adjacent washers, i.e. the perimeter of the central hole 526a and the base 526b, may therefore have flat surfaces formed of the resin portion 527. This is shown in FIG. 9b, which shows a spring 524 formed of the further alternative washers 526 with the resin portions 527 in contact.

The outer sloping surface 536c remains as a composite material as it is not arranged to contact adjacent parts. This may also be advantageous for inspecting the condition of the composite material.

While the spring assemblies described above may be used in the landing gear assembly disclosed in FIGS. 2a to 2d, other landing gear assemblies may also benefit from the spring assembly. For example, landing gear assemblies may have multiple side stay arrangements, each side stay having a spring assembly as described above. The spring assemblies may also be adapted for use in shock absorbers of landing gear. In all such arrangements, the elastically deformable washers may be stressed only when required and may be otherwise substantially unstressed, in particular when the landing gear is retracted.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft landing gear comprising:
   a main strut arranged to be coupled to an aircraft and movable between a deployed condition and a retracted condition,
   a stay arranged to support the main strut, the stay comprising a first stay arm coupled to the main strut and a second stay arm pivotally coupled to the first stay arm and arranged to be coupled to the aircraft, and
   a spring coupled to the second stay arm and the aircraft or the first stay arm, the spring comprising a plurality of elastically deformable washers, the spring being arranged to generate a biasing force between the second stay arm and the aircraft or the first stay arm to bias the second stay arm toward a predetermined orientation relative to the aircraft or the first stay arm, wherein, when the main strut is in the retracted condition, the elastically deformable washers are substantially unstressed,
   wherein the spring further comprises a sliding rod coupled to the second stay arm, the aircraft or the first stay arm, and arranged to slide relative to the respective second stay arm, the aircraft or the first stay arm, the sliding rod extending through the elastically deformable washers, and
   wherein the spring further comprises a disc that is arranged to slide along the sliding rod and is non-rotatably connected with respect to the sliding rod so as to prevent relative rotation between the disc and the sliding rod, the disc being arranged to abut at least one of the elastically deformable washers.

2. The aircraft landing gear of claim 1, wherein the elastically deformable washers are separable and arranged to abut each other, and the biasing force is a compressive biasing force.

3. The aircraft landing gear of claim 1, wherein the elastically deformable washers are conical washers.

4. The aircraft landing gear of claim 1, wherein the elastically deformable washers are formed of an anisotropic material.

5. The aircraft landing gear of claim 4, wherein the anisotropic material is a composite material, optionally comprising carbon fibre.

6. An aircraft including an aircraft landing gear according to claim 1.

7. The aircraft landing gear of claim 1, further comprising a lock assembly arranged to prevent movement of the stay when the lock assembly is in a locked position, the lock assembly comprising a first lock link pivotally coupled to the stay and a second lock link pivotally coupled to the first lock link and arranged to be coupled to the aircraft or another component of the landing gear assembly, wherein the first lock link and the second lock link are movable relative to each other to an over-centre locking condition to prevent movement of the main strut from the deployed condition to the retracted condition, and the spring is arranged to generate the biasing force to move the first stay arm and the second stay arm to the over-centre locking condition.

8. An aircraft landing gear comprising:
   a main strut arranged to be coupled to an aircraft and movable between a deployed condition and a retracted condition;
   a stay arranged to support the main strut, the stay comprising a first stay arm coupled to the main strut and a second stay arm pivotally coupled to the first stay arm and arranged to be coupled to the aircraft;
   a lock assembly arranged to prevent movement of the stay when the lock assembly is in a locked position, the lock assembly comprising a first lock link pivotally coupled to the stay and a second lock link pivotally coupled to the first lock link and arranged to be coupled to the aircraft or another component of the landing gear assembly; and
   a spring coupled to a first member and a second member, the spring comprising a plurality of elastically deformable washers, the spring being arranged to generate a biasing force between the first member and the second member to bias the first member toward a predetermined orientation relative to the second member;
   wherein the first member is the first lock link or the second lock link,
   wherein the spring further comprises a sliding rod coupled to the first and second members, and arranged to slide relative to the first and/or second member, the sliding rod extending through the elastically deformable washers, and wherein the spring further comprises a disc that is arranged to slide along the sliding rod and is non-rotatably connected with respect to the sliding rod so as to prevent relative rotation between the disc and the sliding rod, the disc being arranged to abut at least one of the elastically deformable washers.

9. The aircraft landing gear of claim 8, wherein the first member is the first lock link and the second member is the first or second stay arm or the second lock link.

10. The aircraft landing gear of claim 8, wherein the first member is the second lock link and the second member is the main strut or the aircraft.

11. The aircraft landing gear of claim 8, wherein the biasing force is arranged to bias the first and second members such that the lock assembly is biased into a locked arrangement.

12. The aircraft landing gear of claim 8, wherein the first lock link and the second lock link are movable relative to each other to an over-centre locking condition to prevent movement of the main strut from the deployed condition to the retracted condition, and the spring is arranged to generate the biasing force to move the first stay arm and the second stay arm to the over-centre locking condition.

13. The aircraft landing gear of claim 8, when the main strut is in the retracted condition, the elastically deformable washers are substantially unstressed.

14. The aircraft landing gear of claim 8, wherein the elastically deformable washers are positioned between the disc and an end stop, wherein the end stop is fixedly mounted to the sliding rod.

15. The aircraft landing gear of claim 8, wherein the spring further comprises an end stop that is arranged to slide along the sliding rod, wherein the elastically deformable washers are positioned between the disc and the end stop, and wherein the disc and the end stop are non-rotatably connected together by a guiding shaft.

16. The aircraft landing gear of claim 8, wherein each elastically deformable washer has opposing sides, wherein one side of the opposing sides comprises a composite, fibre reinforced portion and the other side of the opposing sides comprises a resin portion.

\* \* \* \* \*